US010695978B2

(12) United States Patent
Poppe et al.

(10) Patent No.: US 10,695,978 B2
(45) Date of Patent: Jun. 30, 2020

(54) SPRAY-DRIED SOFT-PHASE EMULSION POLYMER FOR FILLING THE GUSSETS IN BEAD POLYMER LAYERS IN A BINDER JETTING METHOD

(71) Applicant: Evonik Röhm GmbH, Darmstadt (DE)

(72) Inventors: Dirk Poppe, Frankfurt am Main (DE); Andrea Fruth, Wiesbaden (DE); Stefan Bernhardt, Offenbach (DE); Stephan Wieber, Karlsruhe (DE)

(73) Assignee: Evonik Operations GmbH, Essen (DE)

( * ) Notice: Subject to any disclaimer, the term of this patent is extended or adjusted under 35 U.S.C. 154(b) by 66 days.

(21) Appl. No.: 16/092,996

(22) PCT Filed: Apr. 4, 2017

(86) PCT No.: PCT/EP2017/057909

§ 371 (c)(1),
(2) Date: Oct. 11, 2018

(87) PCT Pub. No.: WO2017/178270

PCT Pub. Date: Oct. 19, 2017

(65) Prior Publication Data

US 2019/0126542 A1 May 2, 2019

(30) Foreign Application Priority Data

Apr. 12, 2016 (EP) .................................... 16164854

(51) Int. Cl.

*B29C 64/165* (2017.01)
*B33Y 70/00* (2020.01)
*B33Y 10/00* (2015.01)
*B22F 3/00* (2006.01)
*B29K 33/00* (2006.01)

(52) U.S. Cl.

CPC ............ *B29C 64/165* (2017.08); *B22F 3/008* (2013.01); *B33Y 10/00* (2014.12); *B33Y 70/00* (2014.12); *B29K 2033/12* (2013.01)

(58) Field of Classification Search

None
See application file for complete search history.

(56) References Cited

U.S. PATENT DOCUMENTS

2015/0030493 A1* 1/2015 Scott ........................ A61L 27/56 419/2
2015/0054195 A1 2/2015 Greyf
2015/0344682 A1 12/2015 Ganapathiappan et al.
2016/0040003 A1 2/2016 Nelliappan et al.
2016/0083589 A1 3/2016 Ganapathiappan et al.
2016/0312037 A1* 10/2016 Zhao ........................ C08L 77/02
2017/0113411 A1* 4/2017 Watanabe ............. A61K 6/891
2017/0252974 A1* 9/2017 Ng ........................ B29C 64/165
2019/0111479 A1* 4/2019 Kasperchik ............. B22F 3/008
2019/0127598 A1 5/2019 Bernhardt et al.

FOREIGN PATENT DOCUMENTS

CN 105 440 199 3/2016
DE 10 2007 025656 2/2008
DE 10 2007 061 445 6/2009

OTHER PUBLICATIONS

English translation of the International Search Report for PCT/EP2017/072673 filed Septemer 11, 2017, which is the international application corresponding to copending U.S. Appl. No. 16/337,238.
English translation of the Wriiten Opinion of the International Searching Authority for PCT/EP2017/072673 filed Sep. 11, 2017, which is the international application corresponding to copending U.S. Appl. No. 16/337,238.
English translation of the International Preliminary Report on Patentability for PCT/EP2017/072673 filed Sep. 11, 2017, which is the international application corresponding to copending U.S. Appl. No. 16/337,238.
European Search Report for EP 16190993.2 filed Sep. 28, 2016, which is the European application corresponding to copending U.S. Appl. No. 16/337,238.
Dubinsky, et al., "Hybrid porous material produced by polymerization-induced phase separation," *Chem. Commun.* 46:2578-2580 (2010).
Dubinsky, et al., "Toward Controlling the Surface Morphology of Macroporous Copolymer Particles," *Macromolecules* 42:1990-1994 (2009).
Gomez, et al., "Effects of Experimental Variables on the Synthesis of Porous Matrices," *Journal of Applied Polymer Science* 79:920-927 (2001).
Horäk, et al., "Porous PolyHEMA Beads Prepared by Suspension Polymerization in Aqueous Medium," *Journal of Applied Polymer Science* 49:2041-2050 (1993).
Okay, et al., "Synthesis and Formation Mechanism of Porous 2-Hydroxyethyl Methacrylate-Ethylene Glycol Dimethacrylate Copolymer Beads," *Journal of Applied Polymer Science* 46:401-410 (1992).
Svec, et al., "New Designs of Macroporous Polymers and Supports: From Separation to Biocatalysis," *Science* 273(5272):205-211 (Jul. 1996).
U.S. Appl. No. 16/337,238, filed Mar. 27, 2019, Wieber.

(Continued)

*Primary Examiner* — Mary Lynn F Theisen
(74) *Attorney, Agent, or Firm* — Law Office of: Michael A. Sanzo, LLC

(57) ABSTRACT

The present invention relates to the technical field of 3D printing, especially in the form of the binder jetting method, in which particles in a powder bed are bonded by means of a printed adhesive to form a three-dimensional object. The particles may be inorganic particles, for example sand or a metal powder, or polymeric particulate, for example polymethacrylates or polyamides. For this purpose, polymethacrylates may take the form, for example, of suspension polymers, called bead polymers.

20 Claims, No Drawings

(56) References Cited

OTHER PUBLICATIONS

English language translation of the International Search Report for corresponding PCT/EP2017/057909, filed Apr. 4, 2017.

English language translation of the Written Opinion of the International Searching Authority for corresponding PCT/EP2017/057909, filed Apr. 4, 2017.

English language translation of the International Preliminary Report on Patentability for corresponding PCT/EP2017/057909, filed Apr. 4, 2017.

European Search Report for corresponding European application, EP 16 16 4854 filed Sep. 20, 2016.

English language translation of the European Search Opinion for corresponding European application, EP 16 16 4854 filed Sep. 20, 2016.

English language translation of the International Search Report for PCT/EP2017/058796 filed Apr. 12, 2017, which is the international application corresponding to copending U.S. Appl. No. 16/094,879.

English language translation of the Written Opinion of the International Searching Authority for PCT/EP2017/058796 filed Apr. 12, 2017, which is the international application corresponding to copending U.S. Appl. No. 16/094,879.

English language translation of the International Preliminary Report on Patentability for PCT/EP2017/058796 filed Apr. 12, 2017, which is the international application corresponding to copending U.S. Appl. No. 16/094,879.

European Search Report for EP 16 16 6134 filed Oct. 24, 2016, which is the European application corresponding to copending U.S. Appl. No. 16/094,879.

English language translation of the European Search Opinion for EP 16 16 6134 filed Oct. 24, 2016, which is the European application corresponding to copending U.S. Appl. No. 16/094,879.

Presser, Jonas, "Neue Komponenten für das generative Fertigungsverfahren des 3D-Drucks," Dissertation (2012); retrieved from the internet: http://tuprints.ulb.tu-darmstadt.de/2963/, with English language machine translation of abstract.

U.S. Appl. No. 16/094,879, filed Oct. 18, 2018, Bernhardt.

Non final Office Action for copending U.S. Appl. No. 16/094,879, dated Feb. 24, 2020.

Notice of Allowance for copending U.S. Appl. No. 16/337,238, dated Feb. 24, 2020.

* cited by examiner

SPRAY-DRIED SOFT-PHASE EMULSION POLYMER FOR FILLING THE GUSSETS IN BEAD POLYMER LAYERS IN A BINDER JETTING METHOD

CROSS REFERENCE TO RELATED APPLICATIONS

The present application is US national stage of international application PCT/EP2017/057909, which had an international filing date of Apr. 4, 2017, and which was published on Oct. 19, 2017. Priority is claimed to European application EP 16164854.8, filed on Apr. 12, 2016.

FIELD OF THE INVENTION

The present invention relates to the technical field of 3D printing, especially in the form of the binder jetting method, in which particulate material in a powder bed is bonded by means of a printed adhesive to form a three-dimensional object. The particulate materials may be inorganic materials, for example sand or a metal powder, or particulate polymeric materials, for example polymethacrylates or polyamides. For this purpose, polymethacrylates may take the form, for example, of suspension polymers, called bead polymers.

The present invention especially relates to mixtures of emulsion and suspension polymers as powder for 3D printing, which differ from the prior art in that the emulsion polymers have been spray-dried or precipitated in the presence of a suspension polymer. This gives rise to powders having a bulk density higher than in the case of pure suspension polymers. In this way, the advantages of rapid dissolution on contact with the printed binder and a resultant increase in viscosity or a greater amount of binder applicable within a shorter time are combined with the advantages of higher bulk density and hence a smaller volume of binder that has to be used. A great advantage of this procedure is additionally that a product with less warpage is formed.

PRIOR ART

Binder jetting is an additive production process which is also known by the term "3D inkjet powder printing", which gives a good description of the method. This method involves applying a liquid binder, for example by means of a standard inkjet printhead, to a powder layer and hence selectively bonding a portion of this powder layer together. The application of new powder layers which alternates with this application ultimately results in formation of a three-dimensional product. In binder jetting, it is possible to use various materials as binders and as powder material. Suitable powder materials are, for example, polymer particles, sand, ceramic particles or metal powders each having a diameter between 10 and a few hundred μm. In the case of use of sand, there is usually no need for reprocessing of the finished article. In the case of other materials, for example the polymer powders including PMMA, subsequent curing, sintering and/or infiltration of the article may be necessary. However, such subsequent processing is actually undesirable since it is time-consuming and/or costly and, because of shrinkage that often occurs, can lead to an adverse effect on dimensional stability.

The binder is generally applied in an analogous manner to conventional two-dimensional paper printing. Examples of binder systems are liquid vinylic monomers which are cured by means of peroxides present in the powder material. Alternatively or additionally, the powder material comprises a catalyst which accelerates curing or actually enables it at the ambient temperature. Examples of such a catalyst for acrylate resins or monomers with peroxides as initiator are amines, especially tertiary amines.

Binder jetting has great advantages over other 3D printing methods such as FDM or SLS, which are based on melting or welding of the material that forms the product. For instance, this method has the best suitability among all known methods for directly realizing coloured objects without subsequent colouring. This method is also especially suitable for producing particularly large articles. For instance, products up to the size of a room have been described. Moreover, other methods are also very time-consuming in terms of the overall printing operation up to the finished object. Apart from any necessary reprocessing, binder jetting can even be considered to be particularly time-efficient compared to the other methods.

Furthermore, binder jetting has the great advantage over other methods that it is effected without supply of heat. In the case of methods effected by means of melting or welding, this inhomogeneous introduction of heat gives rise to stresses in the product, which usually have to be dissipated again in subsequent steps such as a thermal after treatment, which means further expenditure of time and costs.

A disadvantage of binder jetting is the method-related porosity of the product. For instance, for objects printed by means of binder jetting, only tensile strengths about 20 times smaller than the injection mouldings made from a comparable material are achieved. Because of this disadvantage, the binder jetting method has to date been used predominantly for production of decorative pieces or for casting sand moulds. The porosity arises particularly from the fact that only some of the cavities between the particles are filled by the binder in known printing methods. This is an inevitable result of the low viscosity of the liquid binders applied by printing. Should more be applied, this runs into neighbouring particles or cavities between the particles (called gaps) directly before and also during the commencement of curing. This in turn leads to an imprecise, non-clean impression of the print, or to a low surface accuracy in the finished article.

J. Presser, in his thesis "Neue Komponenten fur das generative Fertigungsverfahren des 3D-Drucks" [New Components for the Additive Manufacturing Method of 3D Printing] (TU Darmstadt, 2012), describes the use of precipitated emulsion polymers in powder form for the binder jetting method. For this purpose, these emulsion polymers partly fill the interstices between the actual particles and hence lead to a reduction in porosity. However, processing via coagulation, drying and sieving leads to non-round secondary particles of irregular size distribution. Moreover, it has been found that the emulsion polymers used in this way barely increase the bulk density and do not have any significant effect in relation to the stability of the printed object.

Problem

The problem underlying the present invention was that of accelerating the binder jetting method by making it possible to print polymer particles without any need for time-consuming reprocessing of the product.

A further problem addressed was that of improving the mechanical stability of products of a binder jetting method, especially those based on a polymer powder, especially a PMMA powder, such that they can be used as functional components.

More particularly, a problem addressed in this connection was that of realizing mouldings having at least 50% of the tensile strength of an analogous injection moulding. "Analogous" in this case means, for example, that an injection-moulded PMMA moulding is compared with a binder jetting product based on a PMMA powder.

Further problems which are not stated explicitly may become apparent from the description, the examples or the claims of the present application, or from the overall context thereof.

Solution

These problems have surprisingly been solved by means of a novel method of producing three-dimensional objects from a powder bed by means of a binder jetting method. In this method, a three-dimensional object is formed by multiple repetition of method steps a) and b). Method step a) comprises the application of a powder layer on the surface. According to the invention, the powder bed comprises at least two different kinds of particulate material. The first particulate material, which is generally a particulate polymer material, has a median diameter between 10 and 500 μm, whereas the second particulate material is characterized in that it comprises coagulated emulsion polymers having a median secondary diameter between 0.5 μm and 80 μm. Method step b) involves, in alternation with method step a), subsequently, the selective application of a binder and the subsequent or simultaneous thickening of this binder in the powder bed by swelling of the powder and/or curing.

Preference is given to a variant of this method in which the coagulated emulsion polymers are the spray-dried product of an emulsion polymerization. These emulsion polymers especially have a median primary diameter between 100 and 800 nm. It is further preferable that the spray-dried and coagulated emulsion polymers are mixed with the first particles.

Preferably, the secondary diameter of the coagulated emulsion polymers has a median diameter between 20 and 80 μm.

Spray-drying of an emulsion polymer leads to agglomerates. In the case of commixing with PMMA suspension particles, an increase in the bulk density has now surprisingly been observed. This can be explained by the observation in some cases that a relevant portion of the emulsion polymer is present in the gaps in the packing of the suspension particles.

As an alternative to spray-dried coagulated emulsion polymers, it is also possible to use freeze-dried coagulated emulsion polymers.

As an alternative to the emulsion polymers spray-dried and coagulated by freeze drying, preference is given to a third process variant in which the coagulated emulsion polymers are particles in wholly or partly coagulated form on the surface of the first particles. Such particles are achieved, for example, by precipitation of the emulsion from the polymerization after addition of the first particulate material to this emulsion and subsequent filtration and drying of the particle combination thus precipitated. More preferably, the precipitation is promoted by addition of suitable coagulating aids and/or by a change in the pH of the emulsion.

Preferably, the secondary diameter of the coagulated emulsion polymers has a median diameter between 1 and 5 μm.

In the case of precipitation of an emulsion polymer in the presence of a suspension polymer, the former coagulates preferentially on the surface of the suspension polymer. The result of this is surprisingly not smaller bulk densities but comparable or even higher bulk densities than in the case of the pure suspension polymers.

It has additionally been found that, surprisingly, even in the case of comparable bulk density of the powder beds used in the process according to the invention to give pure suspension polymers, after irrigation with the binder, test specimens having relatively low porosity and relatively high mechanical stability are obtained. This is explained by an increase in the powder surface area and has the effect that more binder can be applied to a powder layer before it also flows undesirably into underlying layers of the powder bed.

Further preferably, in the method, the first particulate material comprises a particulate polymer material comprising an initiator suitable for curing the binder or a catalyst or accelerator that accelerates the curing. The initiators mentioned may, for example, be peroxides or azo initiators that are common knowledge to the person skilled in the art. The accelerators are, for example, compounds which, in combination with an initiator which in turn has a relatively high breakdown temperature on its own, lower the breakdown temperature of this initiator. This enables commencement of curing even at ambient temperature in the printer or in a thermal treatment step up to 50° C. In the case of an initiator with a high breakdown temperature, suitable examples for this purpose would be secondary or tertiary, usually aromatic amines. Said catalysts can have a corresponding or similar activating effect. However, the exact composition of the initiator system can generally be chosen by the person skilled in the art in a simple manner.

More preferably, the first particles, i.e. the polymer particles, are PMMA suspension polymers having a median diameter between 25 and 150 μm, preferably between 30 and 120 μm and more preferably between 35 and 100 μm.

Alternatively, additionally or complementarily thereto, the second particulate material may comprise an initiator suitable for curing of the binder or a catalyst or accelerator that accelerates the curing. Additionally in this case means that the compound may be the same compound as or a similar compound to that in the first particles, for example another initiator. Complementarily in turn means, for example, that the first particulate material comprises an initiator and the second particulate material an accelerator which only come into contact through the respective swelling with the binder and as a result only then start a curing reaction.

The second particles in the method according to the invention are preferably acrylate-based emulsion polymers having a glass transition temperature at least 20° C. and preferably at least 40° C. below the glass transition temperature of the first particulate material. All glass transition temperatures are determined by means of DSC. In this regard, the person skilled in the art is aware that DSC is only sufficiently conclusive when, after a first heating cycle up to a temperature which is a minimum of 25° C. above the highest glass transition or melting temperature but at least 20° C. below the lowermost breakdown temperature of a material, the material sample is kept at this temperature for at least 2 min. Thereafter, the sample is cooled back down to a temperature at least 20° C. below the lowermost glass transition or melting temperature to be determined, where the cooling rate should be not more than 20° C./min, preferably not more than 10° C./min. After a further wait time of a few minutes, the actual measurement is effected, in which the sample is heated at a heating rate of generally 10° C./min or less up to at least 20° C. above the highest melting or glass transition temperature. The respective highest and lowest temperature limits can be roughly predetermined in simple preliminary measurements with a separate sample.

Irrespective of the embodiment, the weight ratio of emulsion polymer to suspension polymer is preferably between 0.1:9.9 and 2:8, preferably between 0.2:9.8 and 1:9.

This method according to the invention, in which mixtures of emulsion and suspension polymers are used as powder for 3D printing, gives rise to powders having a bulk density comparable to suspension polymers. It is even possible in accordance with the invention to achieve higher bulk densities than would be known from the prior art. Compared to simple mixtures of suspension and emulsion polymers, processing in the form of spray-dried emulsion polymers or by precipitation thereof in the presence of a suspension polymer can surprisingly additionally increase the bulk densities. This achieves further advantages over the prior art for the binder jetting 3D printing method, which lie, for example, in faster dissolution of the first particulate material and/or of the second particulate material on contact with the printed binder. This gives rise, for example, to a faster increase in viscosity, and it is possible to apply more binder within a shorter time and overall. In this way, for example, a printed image of better overall resolution with a better appearance of the surface is achievable.

Furthermore, the method according to the invention gives rise to the further advantages of a higher bulk density overall and hence a smaller volume which has to be filled with a binder, which in turn leads to reduced warpage in the printed object.

Furthermore, better filling of the now smaller cavities, i.e. of the gaps, between the polymer particles in the powder bed gives rise to better mechanical stability of the printed object. It is particularly advantageous, furthermore, that these advantages all occur in combination.

It is further advantageous that both processing methods are implementable on the industrial scale.

An alternative method, but one which is not in accordance with the invention, in which suspension polymers are mixed with simple non-coagulated emulsion polymers results in a low bulk density compared to the present two variants of a method according to the invention, which is disadvantageous for the printing process. For instance, printing in such a powder bed leads to products having more significant warpage, higher porosity and lower mechanical stability. By blending, for example, with PMMA suspension particles having a median diameter of about 60 μm, it was possible to slightly increase the bulk density, but it was still below that of the pure suspension polymer. A further disadvantage of such a method is additionally that the processing of the non-coagulated emulsion polymer is very complex.

A couple of implementation options for the present invention are elucidated by way of example hereinafter, but they should not be regarded as a limitation of the method according to the invention. These are merely examples which, as well as many other alternative configuration options, enable effective execution of the method according to the invention.

The suspension polymers used are, for example, pulverulent materials produced by free-radical polymerization in the presence of water and having a volume-average median particle diameter (d50) between 35 and 100 μm, especially preferably between 30 and 80 μm, most preferably between 35 and 60 μm. Preferably, the suspension polymers are PMMA or MMA copolymers. For this purpose, the comonomers may be selected, for example, from the group of the acrylates, methacrylates and styrene.

Emulsion polymers are obtained, for example, from dispersions produced by free-radical polymerization in the presence of water. The precipitation in the second inventive embodiment of the present invention is effected, for example, by addition of suitable coagulation aids or by altering the pH. Preferably, the emulsion polymers are PMMA or MMA copolymers. For this purpose, the comonomers here too may be selected, for example, from the group of the acrylates, methacrylates and styrene.

It has been found to be particularly useful when the composition of the emulsion particles leads to a glass transition temperature well below that of the suspension particles, preferably at least 20° C. lower, more preferably at least 40° C. lower. This gives rise to particularly rapid dissolution of the emulsion particles, which leads to a rapid increase in viscosity of the binder, which in turn prevents flooding of lower-lying powder layers in the powder bed that are not to be printed.

For further illustration of the second embodiment of a precipitation of emulsion polymers in the presence of a suspension polymer (SP), it should be noted that, for example, a ratio of about 2.5% by weight of emulsion polymer to about 97.5% by weight of suspension polymer has been found to be favourable.

The invention claimed is:

1. A method of producing three-dimensional objects from a powder bed by means of a binder jetting method by multiple repetition of the method steps of:

a) applying a powder layer on a surface, wherein the powder bed includes at least two different kinds of particulate material, the first particulate material having a median diameter between 10 and 500 μm, and the second particulate material comprising coagulated emulsion polymers having a median secondary diameter between 0.5 μm and 80 μm; and b) selectively applying a binder and subsequently or simultaneously thickening this binder in the powder bed by swelling the powder and/or curing.

2. The method of claim 1, wherein the coagulated emulsion polymers comprise a spray-dried product of an emulsion polymerization, these emulsion polymers have a median primary diameter between 100 and 800 nm, and the spray-dried and coagulated emulsion polymers are mixed with the first particulate material.

3. The method of claim 1, wherein the coagulated emulsion polymers comprise particles that, as a result of precipitation of the emulsion from the polymerization after addition of the first particles to this emulsion and subsequent filtration and drying, are wholly or partly in coagulated form on the surface of the first particulate material.

4. The method of claim 1, wherein the coagulated emulsion polymers comprise a freeze-dried product of an emulsion polymerization, these emulsion polymers have a median primary diameter between 100 and 800 nm, and the freeze-dried and coagulated emulsion polymers are mixed with the first particulate material.

5. The method of claim 1, wherein the first particulate material comprises a particulate polymer material comprising an initiator suitable for curing the binder or a catalyst or accelerator that accelerates the curing.

6. The method of claim 5, wherein the particulate polymer material comprises a PMMA suspension polymer having a mean diameter between 30 and 120 μm.

7. The method of claim 1, wherein the second particulate material comprises acrylate-based emulsion polymers having a glass transition temperature, measured by means of DSC, of at least 20° C. below the glass transition temperature of the first particulate material determined by means of DSC.

8. The method of claim 1, wherein the second particulate material comprises acrylate-based emulsion polymers having a glass transition temperature, measured by means of DSC, of at least 40° C. below the glass transition temperature of the first particulate material determined by means of DSC.

9. The method of claim 3, wherein the precipitation is promoted by addition of suitable coagulating aids and/or a change in the pH of the emulsion.

10. The method of claim 1, wherein the second particulate material comprises an initiator suitable for curing the binder or a catalyst or accelerator that accelerates the curing.

11. The method of claim 3, wherein the secondary diameter of the coagulated emulsion polymers has a median diameter between 1 and 5 μm.

12. The method of claim 2, wherein the secondary diameter of the coagulated emulsion polymers has a median diameter between 20 and 80 μm.

13. The method of claim 4, wherein the secondary diameter of the coagulated emulsion polymers has a median diameter between 20 and 80 μm.

14. The method of claim 1, wherein weight ratio of emulsion polymer to suspension polymer is between 0.1:9.9 and 2:8.

15. The method of claim 1, wherein the weight ratio of emulsion polymer to suspension polymer is between 0.2:9.8 and 1:9.

16. The method of claim 2, wherein the first particulate material comprises a particulate polymer material comprising an initiator suitable for curing the binder or a catalyst or accelerator that accelerates the curing.

17. The method of claim 16, wherein the second particulate material comprises acrylate-based emulsion polymers having a glass transition temperature, measured by means of DSC, of at least 20° C. below the glass transition temperature of the first particulate material determined by means of DSC.

18. The method of claim 4, wherein the first particulate material comprises a particulate polymer material comprising an initiator suitable for curing the binder or a catalyst or accelerator that accelerates the curing.

19. The method of claim 18, wherein the second particulate material comprises acrylate-based emulsion polymers having a glass transition temperature, measured by means of DSC, of at least 20° C. below the glass transition temperature of the first particulate material determined by means of DSC.

20. The method of claim 19, wherein the second particulate material comprises acrylate-based emulsion polymers having a glass transition temperature, measured by means of DSC, of at least 40° C. below the glass transition temperature of the first particulate material determined by means of DSC.

* * * * *